(12) United States Patent
Lee et al.

(10) Patent No.: US 8,852,405 B2
(45) Date of Patent: Oct. 7, 2014

(54) DUAL-MODE DIVIDING WALL COLUMN

(71) Applicant: LG Chem, Ltd., Seoul (KR)

(72) Inventors: Sung Kyu Lee, Daejeon (KR); Joon Ho Shin, Daejeon (KR); Jang Ku Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/075,652

(22) Filed: Nov. 8, 2013

(65) Prior Publication Data

US 2014/0138237 A1    May 22, 2014

Related U.S. Application Data

(63) Continuation of application No. PCT/KR2012/007503, filed on Sep. 19, 2012.

(30) Foreign Application Priority Data

Sep. 19, 2011  (KR) .................... 10-2011-0093968
Sep. 19, 2012  (KR) .................... 10-2012-0103959

(51) Int. Cl.
*B01D 3/14*     (2006.01)
*B01D 3/32*     (2006.01)
*B01D 3/42*     (2006.01)

(52) U.S. Cl.
CPC ....... *B01D 3/141* (2013.01); *B01D 3/14* (2013.01); *B01D 3/42* (2013.01); *B01D 3/32* (2013.01)
USPC ............... 203/87; 203/99; 202/161; 202/262; 196/100; 208/350; 208/358

(58) Field of Classification Search
CPC ............ B01D 3/14; B01D 3/141; B01D 3/32; B01D 3/42

USPC ................. 202/158, 161, 262; 203/87, 99; 196/100; 208/350, 358
See application file for complete search history.

(56) References Cited

U.S. PATENT DOCUMENTS 4,230,533 A * 10/1980 Giroux .......................... 203/1
6,395,951 B1 * 5/2002 Hamm ....................... 585/827

(Continued)

FOREIGN PATENT DOCUMENTS

KR    1020100085846 A    7/2010
KR    1020110008589 A    1/2011

OTHER PUBLICATIONS

Wang San-Jang et al., "Plant-wide design and control of acid dehydration system via heterogeneous azeotropic distillation and divided wall distillation", Journal of Process Control, 2008, vol. 18, pp. 45-50.

*Primary Examiner* — Nina Bhat
*Assistant Examiner* — Jonathan Miller
(74) *Attorney, Agent, or Firm* — McKenna Long & Aldridge LLP

(57) ABSTRACT

A dual-mode dividing wall column capable of mode switching between a dividing wall column operating mode and a conventional column operating mode, and a distillation method using the dual-mode dividing wall column, wherein when compared to the existing conventional column, the invention can reduce device costs and energy and improve productivity is described. Furthermore, since a mutual conversion between a dividing wall column operating mode and a conventional column operating mode is enabled without shutting down a process, an economic loss which can occur during shutdown caused by the malfunction of a device can be prevented.

11 Claims, 6 Drawing Sheets

(56) References Cited

U.S. PATENT DOCUMENTS

| | | | |
|---|---|---|---|
| 6,540,907 B1 * | 4/2003 | Towler et al. | 208/211 |
| 7,691,239 B2 * | 4/2010 | Kister et al. | 203/2 |
| 7,951,290 B2 * | 5/2011 | Thakkar et al. | 208/210 |
| 8,562,792 B2 * | 10/2013 | King et al. | 203/81 |
| 2003/0047438 A1 * | 3/2003 | Tamura et al. | 203/2 |
| 2003/0183501 A1 * | 10/2003 | Tamura et al. | 203/1 |
| 2004/0026224 A1 * | 2/2004 | Midori et al. | 203/1 |
| 2011/0172458 A1 | 7/2011 | Merenov et al. | |
| 2011/0178328 A1 | 7/2011 | Merenov et al. | |

* cited by examiner

RELATED ART

RELATED ART

DUAL-MODE DIVIDING WALL COLUMN

This application is a Continuation Bypass Application of International Patent Application No. PCT/KR2012/007503, filed Sep. 19, 2012, which claims priority to and the benefit of Korean Patent Application Nos. 10-2011-0093968 filed on Sep. 19, 2011 and 10-2012-0103959, filed on Sep. 19, 2012in the Korean Intellectual Property Office, all of which are hereby incorporated by reference.

BACKGROUND OF THE INVENTION

1. Field of the Invention

The present invention relates to a dual-mode dividing wall column that is capable of mode switching between a dividing wall column operating mode and a conventional column operating mode, and a method of distilling a crude feed material including ethylene or propylene using the dual-mode dividing wall column.

2. Description of the Related Art

Since various feed materials such as crude oil are generally mixtures of many chemicals, it is unusual to use feed materials themselves for industry, and it is usual to use feed materials after separating the feed materials into each chemical. A representative process among chemical processes of separating a mixture is a distillation process.

In general, in the distillation process, the mixture is divided into two, i.e., a high boiling point component and a low boiling point component. Thus, (n−1) columns that are one less than the number (n) of components of the mixture to be separated are used. That is, a two consecutive column structure is mainly used in a process of separating a three-component mixture according to the related art in a distillation industrial site.

The distillation process for separation of a three-component mixture according to the related art is shown in FIG. 1. For example, a two column method, whereby a first column 11 separates a lowest boiling point component D from the mixture and a second column 21 separates a medium boiling point component S and a high boiling point component B from the mixture. In this case, remixing of the medium boiling point component S generally occurs in a lower region of the first column 11. In detail, in the distillation process according to the related art, composition of a product can be easily controlled, while a remixing procedure of the medium boiling point component S occurs in the first column 11, which is a main cause of lowering thermodynamic efficiency of the column and causes additional and unnecessary consumption of energy.

There are many researches on a new distillation structure so as to solve the problems. A representative example of improving separation efficiency using a thermally integrated structure may be a Petlyuk column structure as shown in FIG. 2. In the Petlyuk column, a pre-fractionator 12 and a main column 22 are arranged in a thermally integrated structure so that a low boiling point component and a high boiling point component are primarily separated from a mixture using the pre-fractionator 12, and then a column top part and a column bottom part of the pre-fractionator 12 are introduced into a supply stage of the main column 22 and the main column 22 separates a low boiling point component, a medium boiling point component, and a high boiling point component, respectively, from the mixture. In such a structure, a distillation curve in the Petlyuk column is similar to an equilibrium distillation curve, and energy efficiency is improved. However, design and operation of a process are not easily performed, and in particular, it is difficult to keep a pressure balance in the Petlyuk column. In order to overcome limitations of the Petlyuk column, a dividing wall column (DWC) has been proposed. In detail, the DWC is similar to the Petlyuk column in terms of thermodynamics; however, in terms of a structure, the DWC has a shape in which a dividing wall is installed in the column so that the pre-fractionator of the Petlyuk column is integrated into the main column. This structure is conducive to naturally removing a difficulty of a pressure balance between the pre-fractionator and the main column of the Petlyuk column and a difficulty of an operation caused by the difficulty of the pressure balance so that the operation of the column can be easily performed, two columns are integrated into one, and investigation costs can be remarkably reduced.

For example, as prior arts for the DWC, Korean Patent Laid-open Publication No. 2010-0105500 discloses a dividing wall column for producing 2-ethylhexaneol, and Korean Patent Laid-open Publication No. 2010-0092396 discloses a dividing wall column including a pressure equalization unit.

SUMMARY OF THE INVENTION

The present invention is directed to providing a dual-mode dividing wall column that is capable of consecutively mode switching between a dividing wall column operating mode and a conventional column operating mode without shutting down a process.

One aspect of the present invention provides a dual-mode dividing wall column that is capable of mode switching between a dividing wall column operating mode and a conventional column operating mode.

The dual-mode dividing wall column may include: a column top region; a pre-fractionation region including an upper supply region and a lower supply region; a main separation region including an upper outflow region and a lower outflow region; and a column bottom region, and the dual-mode dividing wall column may include: an outflow line to a reflux device installed in the column top region and inflow lines from the reflux device; a feed material supply line for a dividing wall mode, which is installed at a stage in which the upper supply region and the lower supply region of the pre-fractionation region contact each other; an outflow line of a medium boiling point component that is installed at a stage in which the upper outflow region and the lower outflow region of the main separation region contact each other; and a feed material supply line for a single wall mode and a vapor equalizing line which are installed in the column bottom region.

Mode switching between the dividing wall column operating mode and the conventional column operating mode may be performed using the dual-mode dividing wall column. For example, the feed material supply line for the conventional column operating mode and the vapor equalizing line may be closed in the dividing wall column operating mode, and the feed material supply line for conventional column operating mode and the vapor equalizing line may be opened in the conventional column operating mode.

Another aspect of the present invention provides a distillation method using the dual-mode dividing wall column.

In a dual-mode dividing wall column (DWC) according to one or more embodiments of the present invention, when compared to the existing conventional column operating mode column, device costs and energy can be reduced and productivity can be improved, and in particular, mode switching between a dividing wall column operating mode and conventional column operating mode can be performed without shutting down a process so that an economic loss which can occur during shutdown of a device can be prevented.

DETAILED DESCRIPTION

The present invention relates to a dual-mode dividing wall column that is capable of mode switching between a dividing wall column operating mode and a conventional column operating. In detail, the dual-mode dividing wall column according to the present invention can be converted into the conventional column operating mode without shutting down a process when the dual-mode dividing wall column operates in the dividing wall mode and a malfunction of a device occurs.

Figure 1:
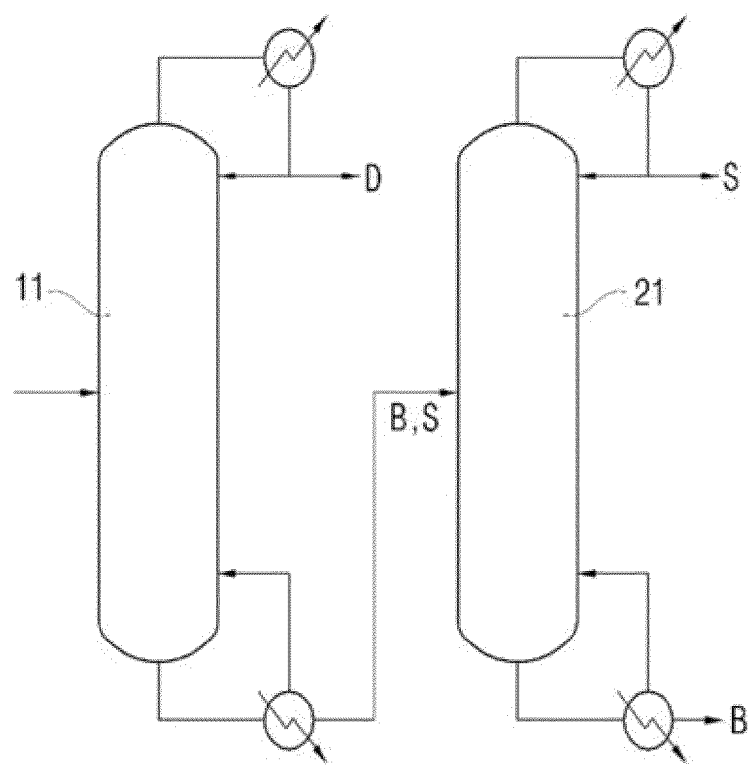
FIG. 1 is a schematic view of an existing conventional column operating mode.
Figure 2:
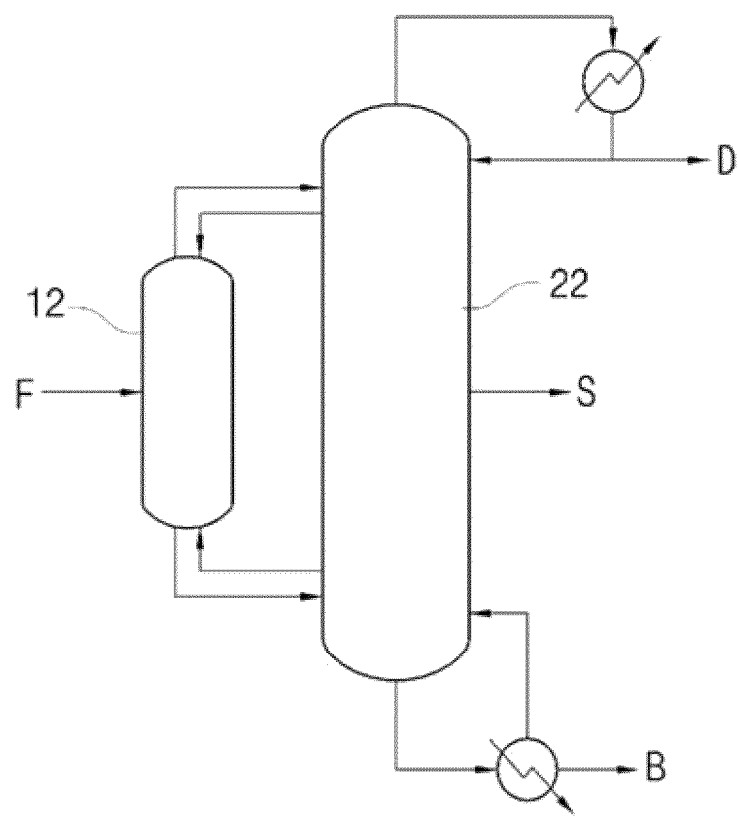
FIG. 2 is a schematic view illustrating a structure of a Petlyuk column.

In the present invention, the conventional column operating mode means an operating mode of the existing column, and a distillation procedure on a path that is substantially the same as that of the column illustrated in FIG. 1 is performed in the conventional column operating mode. In contrast, the dividing wall mode means a column operation mode in which a dividing wall column operating is formed in the column so that a distillation procedure performed by two columns according to the related art can be integrally performed using one column. In the present invention, the conventional column operating mode and the dividing wall column operating mode are used to identify a distillation procedure of a material to be distilled and have no relation to whether the dividing wall is actually installed in the column.

In an embodiment of the present invention, the dual-mode dividing wall column according to the present invention controls a fluid flow of the material to be distilled, thereby performing mode switching between a conventional column operating mode and a dividing wall column operating mode.

In an embodiment of the present invention, the dual-mode dividing wall column may include: a column top region; a pre-fractionation region including an upper supply region and a lower supply region; a main separation region including an upper outflow region and a lower outflow region; and a column bottom region, and the dual-mode dividing wall column may include: an outflow line to a reflux device installed in the column top region and inflow lines from the reflux device; a feed material supply line for a dividing wall column operating mode, which is installed at a stage in which the upper supply region and the lower supply region of the pre-fractionation region contact each other; an outflow line of a medium boiling point component that is installed at a stage in which the upper outflow region and the lower outflow region of the main separation region contact each other; and a feed material supply line for a conventional column operating mode and a vapor equalizing line, which are installed in the column bottom region.

When mode switching between the conventional column operating mode and the dividing wall column operating mode is performed using the dual-mode dividing wall column, for example, the feed material supply line for the conventional column operating mode and the vapor equalizing line may be closed in the dividing wall column operating mode, and the feed material supply line for the conventional column operating mode and the vapor equalizing line may be opened in the conventional column operating mode.

In detail, in the dividing wall column operating mode and in the conventional column operating mode, lines excluding the feed material supply line for the conventional column operating mode and the vapor equalizing line may be closed or opened contrary to opening or closing of the feed material supply line for the conventional column operating mode and the vapor equalizing line in each mode. For example, the outflow line to the reflux device, the inflow line from the reflux device, the outflow line of the medium boiling point component, and the feed material supply line for the dividing wall column operating mode may be opened in the dividing wall mode, and the outflow line to the reflux device, the inflow line from the reflux device, the outflow line of the medium boiling point component, and the feed material supply line for the dividing wall mode may be closed in the conventional column operating mode.

Figure 3:
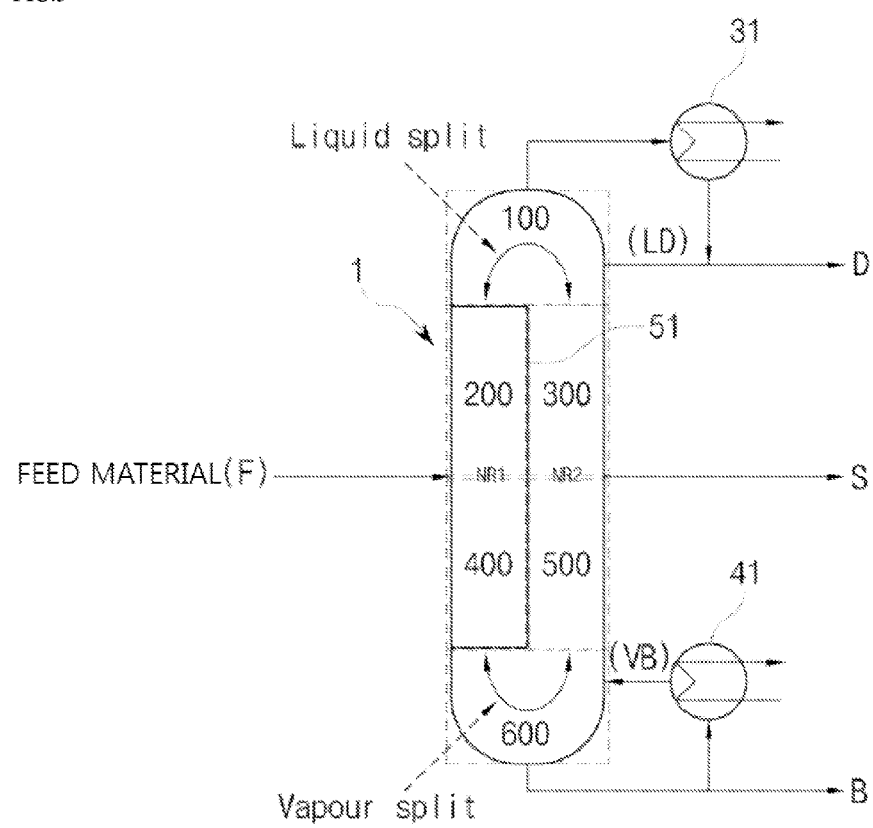
FIG. 3 is a schematic view illustrating a structure of a dual-mode dividing wall column according to an embodiment of the present invention.

A schematic structure of the dual-mode dividing wall column according to an embodiment of the present invention may be illustrated in FIG. 3. Referring to FIG. 3, the dual-mode dividing wall column according to an embodiment of the present invention may include a condenser 31 and/or a reboiler 41 in addition to a dividing wall column 1. The condenser 31 is a device that takes out evaporation heat from a mixture in a gaseous state and condenses the mixture, and a condenser that is used in a chemical engineering device according to the related art may be used in a nonrestrictive manner. The reboiler 41 is a device that provides evaporation heat to a mixture in a liquid state and evaporates the mixture, and a reboiler that is used in the chemical engineering device according to the related art may be used in a nonrestrictive manner. Also, the dividing wall column 1 may be a packing column including a packing. In the packing column, a porous plate or a grid-type support tray is fixed to a column body, the packing as a layer having an appropriate height is filled on the porous plate or the grid-type support tray so that packing beds can be formed, and a liquid distributor is generally positioned between the packing beds. The packing is a solid having a wide surface area and air permeability, vapor-liquid contact occurs in the packing layer so that a distillation operation is performed, and a material used in forming the packing may be ceramic, graphite, or metal.

The dividing wall column 1 may be largely partitioned off into six regions.

In detail, a column top region 100 is a top region of the main column 1 having no dividing wall 51.

An upper supply region 200 is a region, a surface of which is partitioned off by the dividing wall 51 and is a sub-region positioned in an upper portion than a flow of an inflow material (feed material).

An upper outflow region 300 is a region, a surface of which is partitioned off by the dividing wall 51 and is a sub-region positioned in an upper portion than a flow of an outflow material.

A lower supply region 400 is a region, a surface of which is partitioned off by the dividing wall 51 and is a sub-region positioned in a lower portion than the flow of the inflow material (feed material).

A lower outflow region 500 is a region, a surface of which is partitioned off by the dividing wall 51 and is a sub-region positioned in a lower portion than the flow of the outflow material.

A column bottom region 600 is a bottom region of the main column 1 having no dividing wall 51.

Also, the dividing wall column 1 may be largely divided into two regions, i.e., a pre-separation region and a main separation region. The pre-fractionation region may refer to the upper supply region 200 and the lower supply region 400 since the upper supply region 200 and the lower supply region 400 play a similar role to that of a pre-fractionation in the existing conventional column operating mode (a process in which two columns are consecutively used), and the main separation region may refer to the upper outflow region 300 and the lower outflow region 500 since the upper outflow region 300 and the lower outflow region 500 play a role of a main column in the existing conventional column operating mode (the process in which two columns are consecutively used).

The dividing wall column 1 may include at least one inflow point and at least three outflow points.

A feed material F may flow in an inflow intermediate stage NR1 in which the upper supply region 200 and the lower supply region 400 of the dividing wall column 1 contact each other, a low boiling point component D may flow out from the column top region 100, a high boiling point component B may flow out from the column bottom region 600, and a medium boiling point component S may flow out toward an outflow intermediate stage NR2 in which the upper outflow region 300 and the lower outflow region 500 contact each other.

The reason why less energy in a dividing wall distillation process is consumed than in a two consecutive distillation process according to the related art, may be interpreted as a structural difference. In the dividing wall column, a space divided by the dividing wall plays a role of the pre-fractionator. Thus, due to separation of a high boiling point component and a low boiling point component, composition of a liquid almost coincides with an equilibrium distillation curve, the effect of remixing is suppressed, and thermodynamic efficiency for separation can be improved.

The pre-fractionation region including the upper supply region 200 and the lower supply region 400 may play a similar role to that of the pre-fractionator in a process according to the related art. Three components that flow in the pre-fractionation region may be divided into a low boiling point component and a high boiling point component, and a part of the low boiling point component and a part of the high boiling point component that are separated in the pre-fractionation region may flow in the column top region 100 and the column bottom region 600, and the other part thereof may flow in the upper outflow region 300 and the lower outflow region 500 and may be redistilled.

The main separation region including the upper outflow region 300 and the lower outflow region 500 may serve as the main separator in the process according to the related art. The low boiling point component and the medium boiling point component may be separated mainly in an upper portion of the dividing wall of the main separation region, and the medium boiling point component and the high boiling point component may be separated mainly in a lower portion of the dividing wall of the main separation region.

The low boiling point component may pass through the column top region 100 of the main column 1 and the condenser 31 and then, a part of the low boiling point component may be produced as a low boiling point product D, and the other part thereof may be refluxed again in the column top region 100 of the dividing wall column 1 at a liquid flow LD. The high boiling point component may pass through the column bottom region 600 of the dividing wall column 1 and the reboiler 41 and then, a part of the high boiling point component may be produced as a high boiling point product B, and the other part thereof may be refluxed again in the column bottom region 600 of the dividing wall column 1 at a vapor flow VB.

Figure 4:
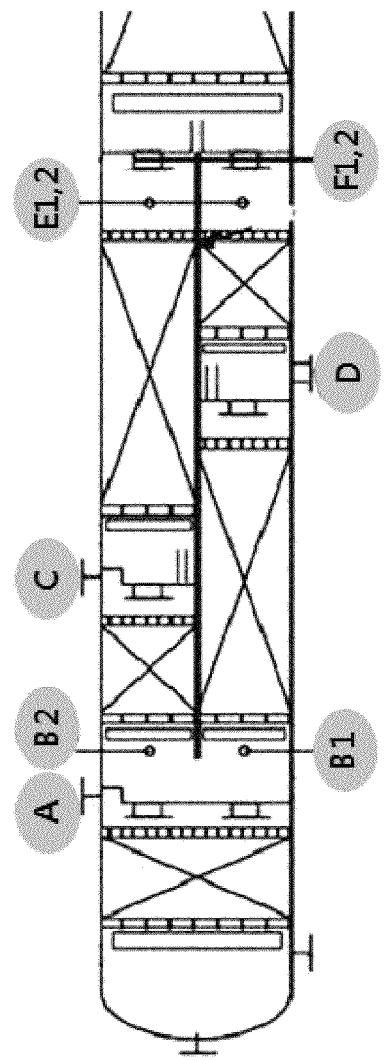
FIG. 4 is a schematic view illustrating a structure of a dual-mode dividing wall column in which nozzles that involve in mode switching of the dual-mode diving wall column are installed, according to another embodiment of the present invention.

A dual-mode dividing wall column according to another embodiment of the present invention may be illustrated in FIG. 4. FIG. 4 illustrates a structure in which nozzles that involve in mode switching of the dual-mode dividing wall column are installed. In detail, an outflow line A to a reflux device, inflow lines B1 and B2 from the reflux device, an outflow line C of a medium boiling point component, a feed material supply line D for a dividing wall mode, feed material supply lines F1 and F2 for a single wall mode, and vapor equalizing lines E1 and E2 may be installed.

In the dual-mode dividing wall column according to the present invention, mutual conversion between the dividing wall column operating mode and the conventional column operating mode may be consecutively performed. In detail, mode switching between the dividing wall column operating mode and the conventional column operating mode may be controlled by opening or closing the outflow line A to a reflux device, the inflow lines B1 and B2 from the reflux device, the outflow line C of a medium boiling point component, the feed material supply line D for a dividing wall column operating mode, the feed material supply lines F1 and F2 for a conventional column operating mode, and the vapor equalizing lines E1 and E2. For example, opening or closing of each line in the dividing wall column operating mode and in the conventional column operating mode may be performed using the following Table 1.

TABLE 1

| Nozzle | Name | Dividing Wall column operating Mode | conventional column operating Mode |
| --- | --- | --- | --- |
| A | Outflow line to reflux device | Opened | Closed |
| B1, B2 | Inflow line from reflux device | Opened | Closed |
| C | Outflow line of medium boiling point component | Opened | Closed |
| D | Feed material supply line for dividing wall mode | Opened | Closed |
| E1, E2 | Vapor equalizing line | Closed | Opened |
| F1, F2 | Feed material supply line for single wall mode | Closed | Opened |

Since mode switching between the dividing wall column operating mode and the conventional column operating mode is performed by opening or closing the nozzles, the dual-mode dividing wall column according to the present invention basically operates in the dividing wall column operating mode, and when a contingency case occurs and the dual-mode dividing wall column according to the present invention cannot operate in the dividing wall column operating mode, switching into the conventional column operating mode may be consecutively performed without shutting down a process. Thus, an economic damage which can occur during shutdown can be reduced, and maintenance can be easily performed.

In the dividing wall column operating mode, the pre-fractionation region and the main separation region may represent a temperature difference of 3° C. to 10° C. In the conventional column operating mode, the dividing wall, the pre-fractionation region, and the main separation region do not exist, and temperature at the same stage within the column is the same. However, in the present invention, it will be understood from the temperature difference that the dual-mode dividing wall column may operate due to actions of the dividing wall, the pre-fractionation region, and the main separation region.

Figure 5:
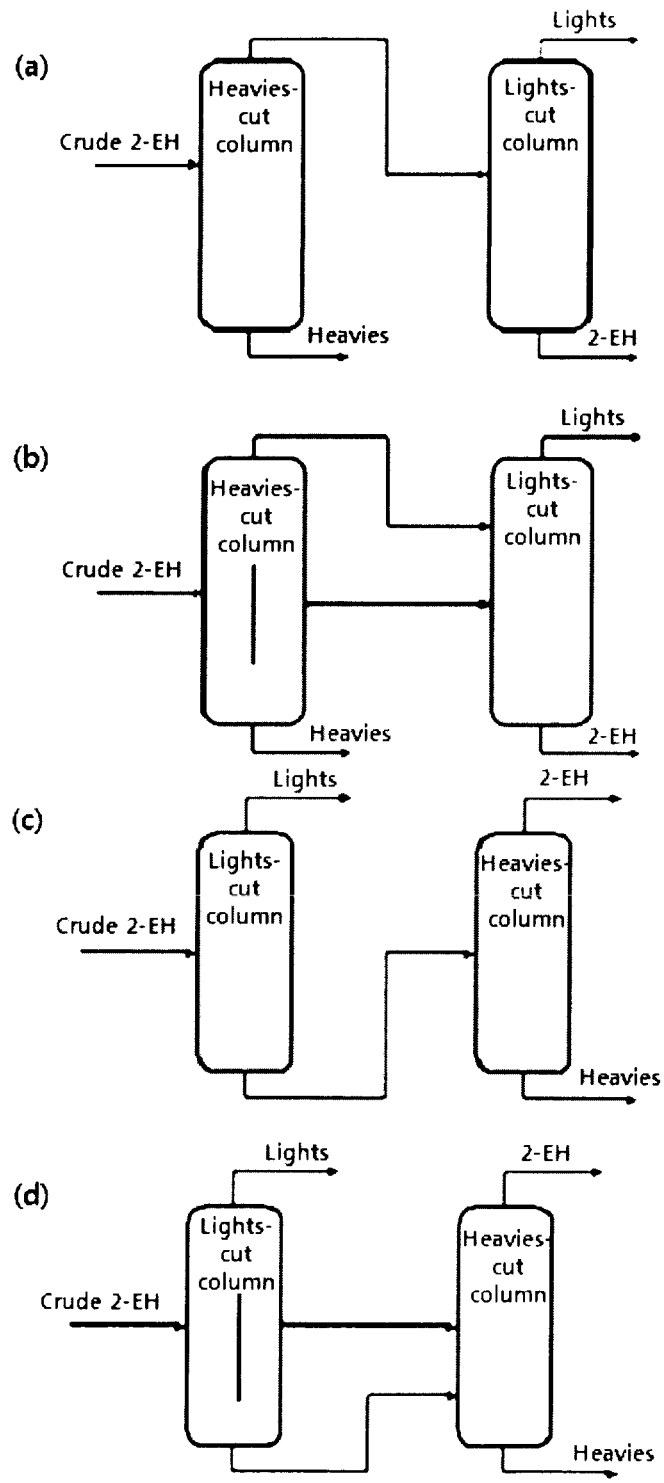
FIG. 5 is process flowcharts of a column for purifying 2-ethylhexanol according to an embodiment of the present invention, in detail, (a) is a schematic view illustrating a process in an existing indirect sequence column, (b) is a schematic view illustrating a process when the dividing wall column is used in an indirect sequence, (c) is a schematic view illustrating a process in an existing direct sequence column, and (d) is a schematic view illustrating a process when the dividing wall column is used in a direct sequence.

The dual-mode dividing wall column according to the present invention may be fluid-connected to an additional column in the conventional column operating mode. In detail, although the dual-mode dividing wall column basically operates in the dividing wall column operating mode, when a contingency case occurs and the dual-mode dividing wall column cannot operate in the dividing wall column operating mode, the dual-mode dividing wall column may operate in the conventional column operating mode in which the dual-mode dividing wall column is fluid-connected to an additional column and two existing columns are consecutively used. Also, the dual-mode dividing wall column may be used by modifying the existing column, and thus device costs can be reduced. For example, one example of a process flow in which a conventional column that consecutively uses two existing columns is modified, may be explained with reference to FIG. 5. In detail, FIG. 5 illustrates 2-ethylhexanol (2-EH) purification, a process flow in an existing indirect sequence column illustrated in (a) and a process flow when the dividing wall column is used in an indirect sequence illustrated in (b) may be compared with each other, and a process flow in an existing direct sequence column illustrated in (c) and a process flow when the dividing wall column is used in a direct sequence illustrated in (d) may be compared with each other.

Referring to FIG. 5(a), in the existing column, crude 2-EH flows in an inlet formed at an intermediate stage of a first column. The first column is a heavies-cut column, heavies components flow out toward a bottom end of the first column, and the remaining components flow in a lights-cut column that is a second column. In the second column, lights components flow out toward a top end of the second column, and purified 2-EH is obtained from a bottom end of the second column. In contrast, in the dividing wall column (b), a dividing wall is installed at the heavies-cut column that is the first column. Components that flow out from a top end and an intermediate stage of the first column are introduced into the lights-cut column that is the second column, and purified 2-EH is obtained from the bottom end of the second column.

Referring to FIG. 5(c), in the existing column, crude 2-EH flows in an inlet formed at an intermediate stage of a first column. The first column is a lights-cut column, lights components flow out toward a top end of the first column, and the remaining components are introduced into a heavies-cut column that is a second column. In the second column, heavies components flow out toward a bottom end of the second column, and purified 2-EH is obtained from a top end of the second column. In contrast, in the dividing wall column (d), the dividing wall is installed at the lights-cut column that is the first column. Components that flow out toward a bottom end and an intermediate stage of the first column are introduced into the heavies-cut column that is the second column, and purified 2-EH is obtained from the top end of the second column.

Liquid splitting in the pre-fractionation region and the main separation region according to the present invention may be equally performed. In detail, liquid splitting may be equally performed using a liquid distributor installed between the packing beds, and a liquid split ratio of two regions divided by the dividing wall may be maintained at 1:1. Thus, a difference in pressure drop between the pre-fractionation region and the main separation region divided by the dividing wall in the column can be reduced to be less than or equal to 1 mmHg, and thus the column can easily operate. Also, in order to reduce the difference in pressure drop, a vapor split ratio of two regions divided by the dividing wall may be controlled using the vapor equalizing lines.

Figure 6:
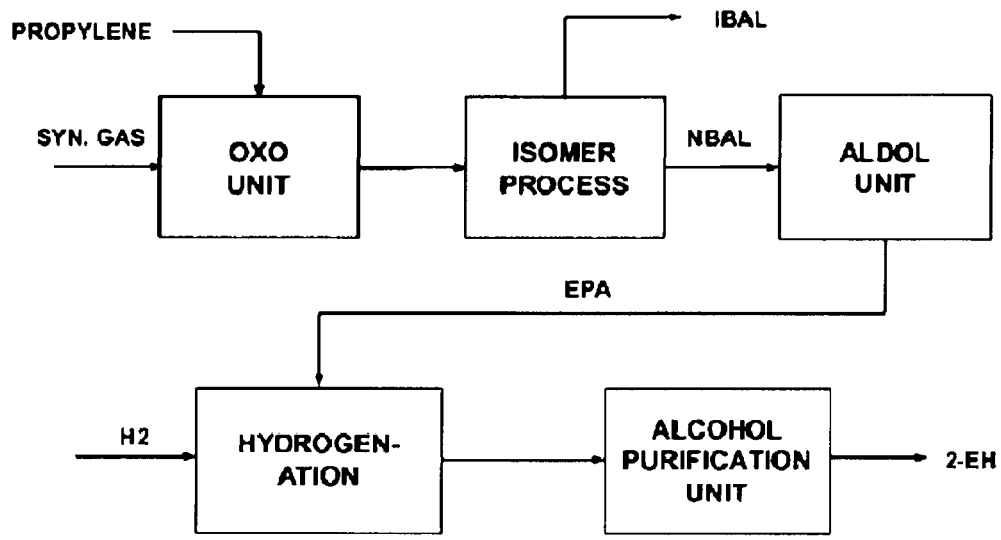
FIG. 6 is a flowchart schematically illustrating a process of producing and purifying 2-ethylhexanol.

The present invention may include a distillation method using the dual-mode dividing wall column according to the present invention. In detail, the present invention may include a method of distilling a crude feed material, a material to be distilled of which is an organic compound having a carbon number of 2 to 8. For example, the material to be distilled of the crude feed material may be 2-ethylhexanol, acryl, or normal butanol (n-butanol), and a production process flowchart of 2-ethylhexanol may be explained with reference to FIG. 6. Referring to FIG. 6, butylaldehyde (BAL) is synthesized from propylene and synthesis gases (SYNGAS) through an oxo reaction in an oxo unit. N-BAL and I-BAL that are isomers of the synthesized butylaldehyde are separated from each other through an isomer process, and N-BAL is converted into 2-ethylhexanol (EPA) through aldol condensation. Thereafter, crude 2-EH is generated from hydrogenation of EPA and hydrogen, and then purified and final 2-EH may be separated using an alcohol purification unit. The alcohol purification unit includes two consecutive simple distillation columns including a heavies-cut column and a lights-cut column. However, the dual-mode dividing wall column according to the present invention is used so that energy can be saved and device costs can be reduced.

In an embodiment of a distillation method using the dual-mode dividing wall column according to the present invention, a crude feed material may flow in a supply intermediate stage in which an upper supply region and a lower supply region contact each other, a low boiling point component may flow out from a column top region, a high boiling point component may flow out from a column bottom region, and a medium boiling point component may flow out from an outflow intermediate stage in which an upper outflow region and a lower outflow region contact each other, and the medium boiling point component may be a material to be distilled.

The material to be distilled may be various materials, and materials that can be distilled in the existing column having no dividing wall may be used. As one example, the material to be distilled may be a material that is separated by purifying a crude feed material including an organic compound having a carbon number of 2 to 8. For example, the material to be distilled may be 2-ethylhexanol, acryl, or normal butanol (n-butanol). In detail, crude 2-ethylhexanol may flow in the supply intermediate stage in which the upper supply region and the lower supply region of the column contact each other, the low boiling point component may flow out from the column top region, the high boiling point component may flow out from the column bottom region, and 2-ethylhexanol that is the medium boiling point component may flow out toward the outflow intermediate stage in which the upper outflow region and the lower outflow region contact each other.

The material to be distilled contained in the crude material may be used in an amount of 40 parts by weight or more based on 100 parts by weight of the crude feed material. For example, the material to be distilled may be used in an amount of 40 to 100 parts by weight or 50 to 80 parts by weight based on 100 parts by weight of the crude feed material. Also, the material to be distilled contained in the feed material may have a relatively high purity, i.e., the material to be distilled may be used in an amount of 90 parts by weight or more based on 100 parts by weight of the crude feed material, for example, 90 to 98 parts by weight, 90 to 95 parts by weight, or 92 to 95 parts by weight based on 100 parts by weight of the crude feed material.

The crude feed material may be supplied after being preheated. Thus, energy of about 5% can be saved, which can be performed by a preheater that can be additionally installed.

EXAMPLES

Hereinafter, the present invention will be described with reference to an embodiment and the drawing based on the above description in more detail. The following Example is provided to illustrate the present invention and is not intended to limit the scope of the present invention.

Example

Temperature Profiles Through Simulation

The design and driving capability of a dividing wall column were evaluated using simulation software such as Aspen Plus and Pro-II in order to check physical and thermodynamic characteristics of the dividing wall column. Design variables, such as the total number, supply, and calculation positions of trays and liquid and vapor split ratios to a dividing section may be determined by simulation and may be useful in determining a construction cost quotation.

Figure 7:
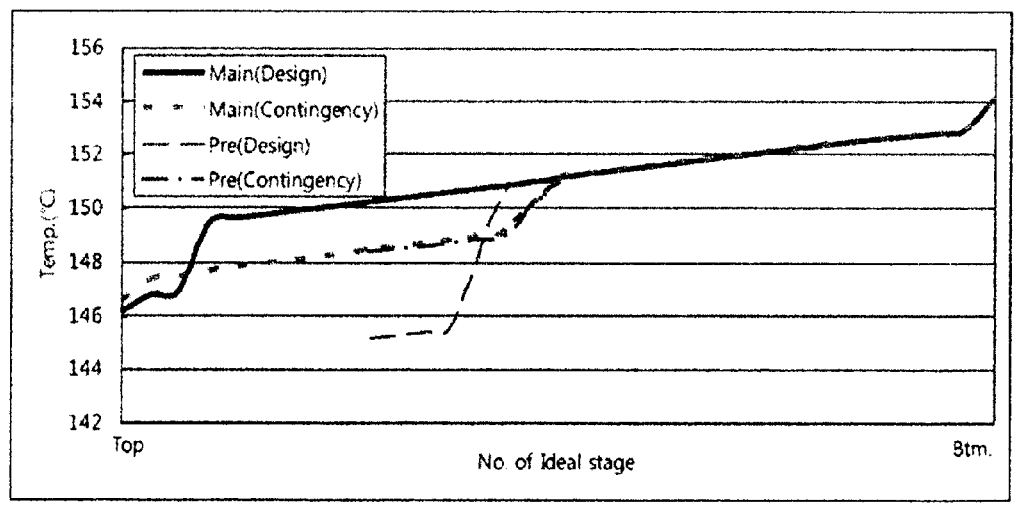
FIG. 7 is a graph showing temperature profiles in a dividing wall column operating mode and in a conventional column operating.

Temperature profiles was performed in a dividing wall column operating mode and in a conventional column operating mode by the simulation and was illustrated in FIG. 7. Referring to FIG. 7, in the dividing wall column operating mode (Design), a temperature profile of a pre-fractionation region (Pre) was different from a temperature profile of a main separation region (Main), and in the conventional column operating mode (Contingency), the temperature profile of the pre-fractionation region (Pre) was the same as that of the main separation region (Main). In addition, in each No. of Ideal stage, temperature was lowered as it got closer to a column top region (Top) and temperature rose as it got closer to a column bottom region (Btm). As a result, it was checked whether mode switching between a dividing wall column operating mode column and a conventional column operating mode column was performed and the dividing wall column operating mode column and the conventional column operating mode column operated.

While the invention has been shown and described with reference to certain exemplary embodiments thereof, it will be understood by those skilled in the art that various changes in form and details may be made therein without departing from the spirit and scope of the invention as defined by the appended claims.

In a dual-mode dividing wall column (DWC) according to the present invention, mode switching between a dividing wall column operating mode and a conventional column operating mode can be performed without shutting down a process so that an economic loss which can occur during shutdown of a device can be prevented.

EXPLANATION OF REFERENCE NUMERALS

1: dividing wall column
11: first column
21: second column
12: pre-separator
22: main separator
31: condenser
41: reboiler
51: dividing wall
100: column top region
200: upper supply region
300: upper outflow region
400: lower supply region
500: lower outflow region
600: column bottom region
NR1: inflow intermediate stage
NR2: outflow intermediate stage
F: feed material (feed)
B: high boiling point component
D: low boiling point component
S: medium boiling point component

What is claimed is:

1. A dual-mode dividing wall column that is capable of mode switching between a dividing wall column operating mode and a conventional column operating mode,
wherein the dual-mode dividing wall column comprises:
a column top region;
a pre-fractionation region including an upper supply region and a lower supply region;
a main separation region including an upper outflow region and a lower outflow region; and
a column bottom region comprising:
an outflow line to a reflux device installed in the column top region and inflow lines from the reflux device;
a feed material supply line for a dividing wall column operating mode, which is installed at a stage in which the upper supply region and the lower supply region of the pre- fractionation region contact each other;
an outflow line of a medium boiling point component that is installed at a stage in which the upper outflow region and the lower outflow region of the main separation region contact each other; and
a feed material supply line for a conventional column operating mode and a vapor equalizing line which are installed in the column bottom region,
wherein,
(1) in the dividing wall column operating mode, the feed material supply line for the single wall mode and the vapor equalizing lines are closed, and the outflow line to the reflux device, the inflow line from the reflux device, the outflow line of the medium boiling point component, and the feed material supply line for the dividing wall column operating mode are opened, and
(2) in the conventional column operating mode, the feed material supply line for the conventional column operating mode and the vapor equalizing line are opened, and the outflow line to the reflux device, the inflow line from the reflux device, the outflow line of the medium boiling point component, and the feed material supply line for the dividing wall column operating mode are closed.

2. The dual-mode dividing wall column of claim 1, wherein consecutive mode switching between the dividing wall column operating mode and the conventional column operating mode is able to be performed.

3. The dual-mode dividing wall column of claim 1, wherein, in the dividing wall column operating mode, a temperature difference between the pre-fractionation region and the main separation region is 3° C. to 10° C.

4. The dual-mode dividing wall column of claim 1, further comprising a liquid distributor that controls liquid splitting in the pre-fractionation region and in the main separation region.

5. The dual-mode dividing wall column of claim 4, wherein a difference in pressure drop between the pre-fractionation region and the main separation region is less than or equal to 1 mmHg 6. The dual-mode dividing wall column of claim 1, wherein the dual-mode dividing wall column is fluid-connected to an additional column in the conventional column operating mode.

7. A distillation method using the dual-mode dividing wall column of claim 1 comprising:
   providing the dual mode dividing wall column;
   feeding a crude feed material in the dual-mode dividing wall column; and
   producing a low boiling point component, a high boiling point component and a medium boiling point component separately by the dual mode dividing wall column.

8. The distillation method of claim 7, wherein a crude feed material flows in a supply intermediate stage in which the upper supply region and the lower supply region contact each other,
   a low boiling point component flows out from the column top region, a high boiling point component flows out from the column bottom region, and a medium boiling point component flows out from an outflow intermediate stage in which the upper outflow region and the lower outflow region contact each other, and
   the medium boiling point component is a material to be distilled.

9. The distillation method of claim 8, wherein the material to be distilled is a material that is separated by purifying a crude feed material including an organic compound having a carbon number of 2 to 8.

10. The distillation method of claim 9, wherein the material to be distilled contained in the crude feed material is used in an amount of 40 parts by weight or more based on 100 parts by weight of the crude feed material.

11. The distillation method of claim 8, wherein the crude feed material is supplied after being preheated.

* * * * *